(12) United States Patent
Pinkerton (10) Patent No.: US 7,086,231 B2
(45) Date of Patent: Aug. 8, 2006

(54) THERMAL AND COMPRESSED AIR STORAGE SYSTEM

(75) Inventor: Joseph F. Pinkerton, Austin, TX (US)

(73) Assignee: Active Power, Inc., Austin, TX (US)

( * ) Notice: Subject to any disclaimer, the term of this patent is extended or adjusted under 35 U.S.C. 154(b) by 0 days.

(21) Appl. No.: 10/361,729

(22) Filed: Feb. 5, 2003

(65) Prior Publication Data
US 2004/0148922 A1 Aug. 5, 2004

(51) Int. Cl.
F01K 25/02 (2006.01)

(52) U.S. Cl. .......................... 60/650; 60/659
(58) Field of Classification Search ................ 60/650, 60/659
See application file for complete search history.

(56) References Cited

U.S. PATENT DOCUMENTS

| 3,677,008 | A |   | 7/1972  | Koutz ........................ 60/59 T |
|-----------|---|---|---------|--------------------------------------|
| 3,869,857 | A |   | 3/1975  | Margen ................... 60/39.18 R |
| 4,100,745 | A |   | 7/1978  | Gyarmathy et al. .......... 60/652 |
| 4,124,805 | A |   | 11/1978 | Jacoby ........................ 290/1 R |
| 4,147,204 | A |   | 4/1979  | Pfenninger ..................... 165/4 |
| 4,150,547 | A |   | 4/1979  | Hobson ........................ 60/659 |
| 4,158,145 | A |   | 6/1979  | Kartsounes et al. .......... 290/52 |
| 4,229,661 | A |   | 10/1980 | Mead et al. ................... 290/44 |
| 4,237,692 | A |   | 12/1980 | Ahrens et al. ................ 60/659 |
| 4,281,256 | A |   | 7/1981  | Ahrens et al. ................. 290/1 |
| 4,347,706 | A | * | 9/1982  | Drost ........................... 60/659 |
| 4,405,010 | A | * | 9/1983  | Schwartz ....................... 165/4 |
| 4,593,202 | A |   | 6/1986  | Dickinson ..................... 290/54 |
| 4,727,930 | A | * | 3/1988  | Bruckner et al. ............ 165/111 |
| 4,765,142 | A |   | 8/1988  | Nakhamkin ................... 60/652 |
| 4,872,307 | A |   | 10/1989 | Nakhamkin ................ 60/39.02 |
| 4,936,098 | A |   | 6/1990  | Nakhamkin ................... 60/652 |
| 5,379,589 | A |   | 1/1995  | Cohn et al. ............... 260/39.59 |
| 5,491,969 | A |   | 2/1996  | Cohn et al. ................ 60/39.05 |
| 5,495,709 | A |   | 3/1996  | Frutschi ..................... 60/39.55 |
| 5,537,822 | A |   | 7/1996  | Shnaid et al. ................. 60/659 |
| 5,924,505 | A | * | 7/1999  | Theurillat et al. ......... 180/65.4 |
| 5,934,063 | A |   | 8/1999  | Nakhamkin ................ 60/39.02 |
| 6,109,018 | A | * | 8/2000  | Rostrup-Nielsen et al. ... 60/777 |
| 6,230,518 | B1| * | 5/2001  | Hahn et al. .................... 62/615 |
| 6,422,016 | B1| * | 7/2002  | Alkhamis .................. 60/641.1 |

OTHER PUBLICATIONS

RJ Foy, "Self Contained Power Supply on the Radio-Based ECP Braking System," GE Transportation Systems: Global Signaling, Sep. 2001.

* cited by examiner

*Primary Examiner*—Hoang Nguyen
(74) *Attorney, Agent, or Firm*—Fish & Neave IP Group of Ropes & Gray LLP (57) ABSTRACT

Combined thermal and compressed air storage systems are provided that utilize an exhaustless heater, such as a thermal storage unit, to provide power with enhanced efficiency. Compressed air is heated by the thermal storage unit prior to entering a turbine, which powers an electrical generator. In various embodiments, ambient air temperature, turbine exhaust or other types of waste heat are used to preheat the compressed air prior to the compressed air entering the thermal storage unit, thereby further increasing system efficiency.

30 Claims, 8 Drawing Sheets

THERMAL AND COMPRESSED AIR STORAGE SYSTEM

BACKGROUND OF THE INVENTION

This invention relates to compressed air storage (CAS) systems. More particularly, this invention relates to CAS systems that provide increased system efficiency, lower emissions and reduced system cost compared to known CAS systems.

CAS systems are well known. Such systems, often used to provide an available source of electrical power, often use compressed air stored in an air tank that is heated and routed to drive a turbine which powers an electrical generator.

Alternatively, rather than heating compressed air from the air tank prior to it being supplied to a turbine, some CAS systems utilize larger pressure tanks and forego the heating process.

One known configuration of a CAS system includes a motor that, when powered by utility power, compresses air into a tank. When electrical power is desired, compressed air from the pressure tank is routed through a fuel-combustion system that heats the compressed air before it enters the turbine inlet. This hot air drives the turbine, which in turn powers an electrical generator.

Such known CAS systems, however, suffer from various deficiencies such as wasted heat during the air compression process, which can result in higher overall operating costs, and a constant requirement for fuel to continuously heat the compressed air. In particular, the fuel-combustion process used in prior CAS systems in order to heat the compressed air produces harmful emissions, and depending on the duty cycle of the heating process, may not provide the most cost effective method of heating.

In view of the foregoing, it is an object of this invention to combine a conventional CAS system with thermally stored energy to provide a combined thermal and compressed air storage (TACAS) system that eliminates the necessity for a fuel-combustion system and the associated hydrocarbon emissions or reduces the quantity of fuel required for system operation.

It is also an object of the present invention to provide a TACAS system that reduces the amount of wasted heat during the air compression process, thereby being capable of supplying electrical power with increased efficiency over prior CAS systems.

SUMMARY OF THE INVENTION

These and other objects of the present invention are accomplished in accordance with the principles of the present invention by providing various TACAS systems that are capable of supplying electrical power with increased efficiency and reduced point source pollution. This reduction of point source pollution is particularly beneficial when the location of the TACAS system makes ventilation difficult, although it may be desirable to reduce the harmful emissions by eliminating the use of a fuel-combustion system in other circumstances as well.

In the various embodiments of the present invention, compressed air is heated by at least one exhaustless heater. In turn, the heated compressed air drives a turbine which powers an electrical generator to provide an electrical output.

One embodiment of the present invention utilizes a thermal storage unit (TSU) (acting as the exhaustless heater), instead of using a fuel-combustion system, to provide power with increased efficiency in the following manner. Electric power from a utility power source is used to heat the thermal storage material of the TSU with relatively high electrical to thermal energy efficiency. Accordingly, a relatively low amount of electrical input, together with thermal insulation, is used to provide and maintain the thermal energy storage in the storage material of the TSU. Utility power also drives a compressor motor that in turn compresses air into a pressure tank. Alternatively, the pressure tank may be a replaceable compressed air cylinder, in which case a compressor is not necessary. When electric power from the TACAS system is needed, compressed air from the pressure tank is routed through a TSU and is thus heated before entering the inlet port of a turbine. This hot air drives the turbine, and the turbine, in turn, powers an electric generator. Through this process, the TACAS system provides an energy output with lower emissions when compared with prior CAS systems, because the TACAS system doesn't require fuel combustion to heat the compressed air prior to entering the turbine inlet.

In another embodiment of the present invention similar to the one described above, the heat of ambient air, which is at a temperature generally greater than that of the compressed air flowing into the TSU, is used to preheat the compressed air prior to entering the TSU unit.

In another embodiment of the present invention, heat from the turbine exhaust is used to preheat the compressed air before entering the TSU unit.

In still a further embodiment of the present invention, waste heat from an independent system or solar heat is used to preheat the compressed air before entering the TSU unit.

In another embodiment of the present invention, a second TSU (which is maintained at a lower temperature) is used to preheat the compressed air before the air enters the main TSU. This second TSU derives its thermal energy by pumping liquid through small heat exchangers that are in thermal contact with the compressor and/or tank in order to capture and store waste heat given off during the compression process.

BRIEF DESCRIPTION OF THE DRAWINGS

The above and other features of the present invention, its nature and various advantages will be more apparent upon consideration of the following detailed description, taken in conjunction with the accompanying drawings, in which like reference characters refer to like parts throughout, and in which.

DETAILED DESCRIPTION OF THE INVENTION

Figure 1A:
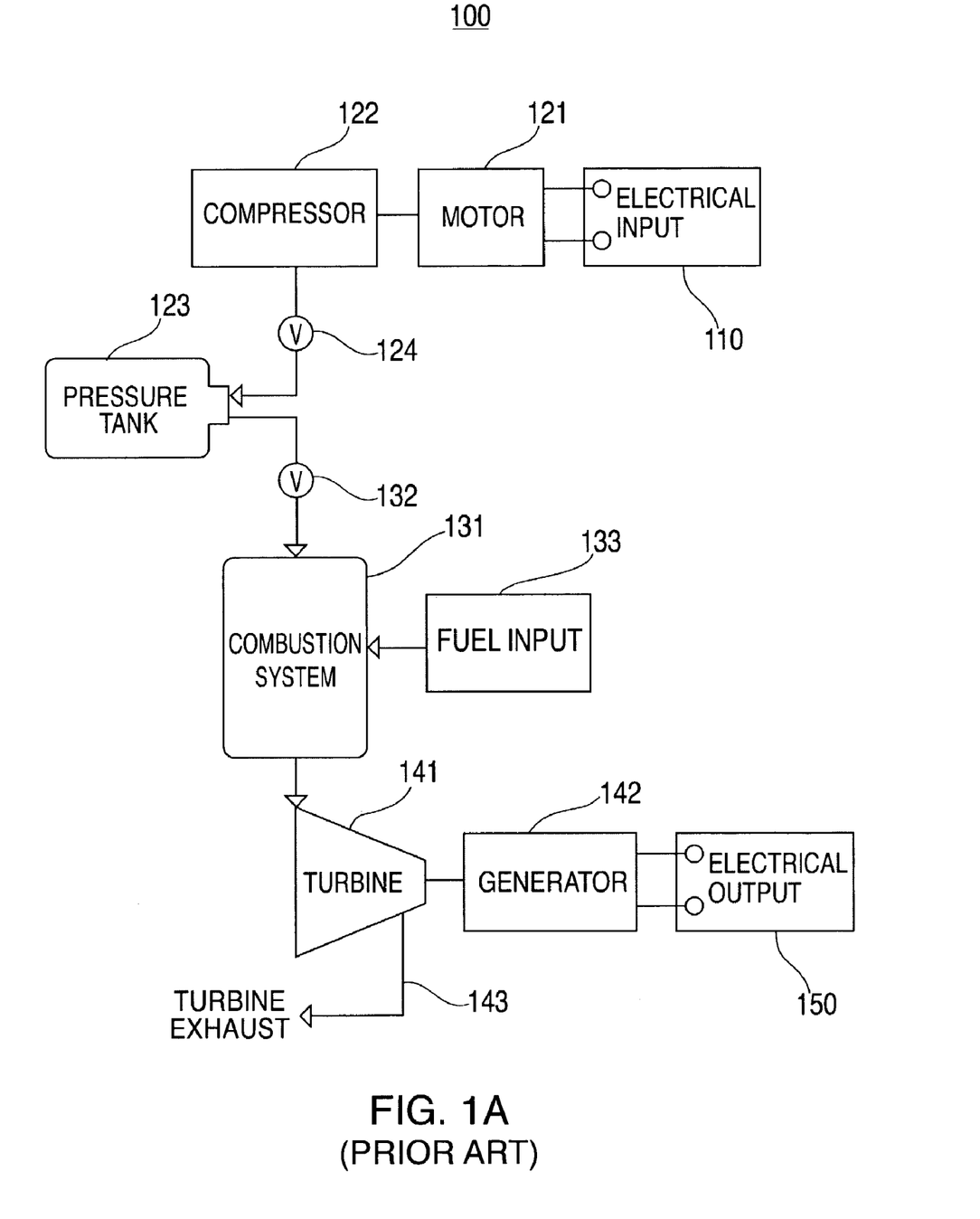
FIG. 1A is a schematic diagram of a conventional CAS system.

FIG. 1A shows a conventional CAS system 100 for providing output power.

CAS system 100 includes an electrical input 110 that provides input power to motor 121, which may be any conventional type of motor (e.g., a rotary electric machine). Electrical input 110 may be utility power or, for example, a battery or other short term power supply. Motor 121 is coupled to compressor 122 so that when motor 121 is receiving power from electrical input 110, it drives compressor 122. Compressor 122 supplies compressed air through a valve 124 into pressure tank 123. Compressor 122 may be any type of compressor which compacts or compresses air (e.g., atmospheric air) to occupy a smaller space inside of pressure tank 123.

As shown in FIG. 1A, pressure tank 123 is connected to compressor 122 through valve 124. It should be understood, however, that pressure tank 123 may be replaced with any other suitable type of air reservoir capable of storing compressed air. For example, an underground salt dome (not shown) may be used in place of pressure tank 123.

When electric power is needed from CAS system 100, compressed air from pressure tank 123 is routed through valve 132 to combustion system 131. Combustion system 131, as shown in FIG. 1A, receives fuel from a fuel input 133 which is mixed with the air being supplied through valve 132. Combustion system 131 ignites and burns the fuel, and the resulting exhaust gases are directed to turbine 141.

The hot air emerging from combustion system 131 flows against the turbine rotor (not shown) of turbine 141 and drives turbine 141, which may be any suitable type of turbine system (e.g., a radial-flow turbine). In turn, turbine 141 drives electrical generator 142, which produces power and provides it to electrical output 150.

Also shown in FIG. 1A is turbine exhaust 143 (e.g., the exhaust gases emerging from turbine 141). Turbine exhaust 143 may be vented through an exhaust pipe (not shown), or simply released to recombine with atmospheric air.

CAS system 100, however, is inefficient and polluting because it requires fuel to heat cold input air prior to the air being supplied to turbine 141, and because a relatively large amount of energy is lost in the form of wasted heat during the compression process.

Figure 1B:
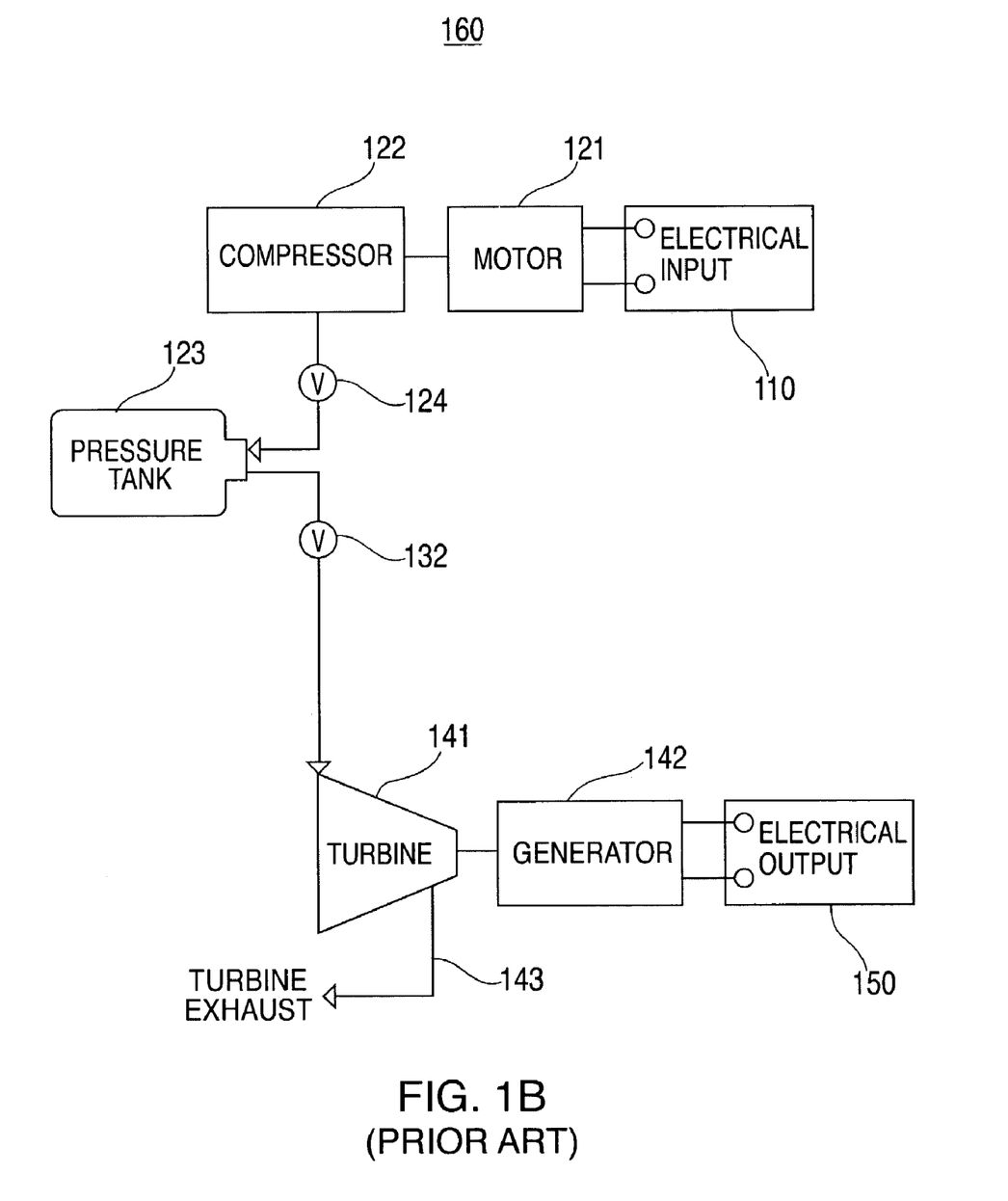
FIG. 1B is a schematic diagram of another conventional CAS system.

CAS system 160, shown in FIG. 1B, is similar to CAS system 100 shown in FIG. 1A, except that combustion system 131 and fuel input 133 are not utilized. Except for the lack of a combustion system, CAS systems 100 and 160 operate in essentially the same manner, using similar components which are labeled with identical reference numerals.

As a result of the difference between CAS system 100 and CAS system 160, CAS system 160 is simpler from having less components. Also, CAS system 160 does not require fuel to heat compressed air prior to the compressed air from pressure tank 123 being supplied to turbine 141. Therefore, no emissions are given off by a heating process.

Due to the loss of heating capability, however, pressure tank 123 of CAS system 160 will likely need to be much larger (and therefore more expensive) than pressure tank 123 of CAS system 100. For example, pressure tank 123 of FIG. 1B may need to be 2–4 times larger than tank 123 of FIG. 1A in order to provide the same level of power output through turbine 141 and generator 142.

Figure 2:
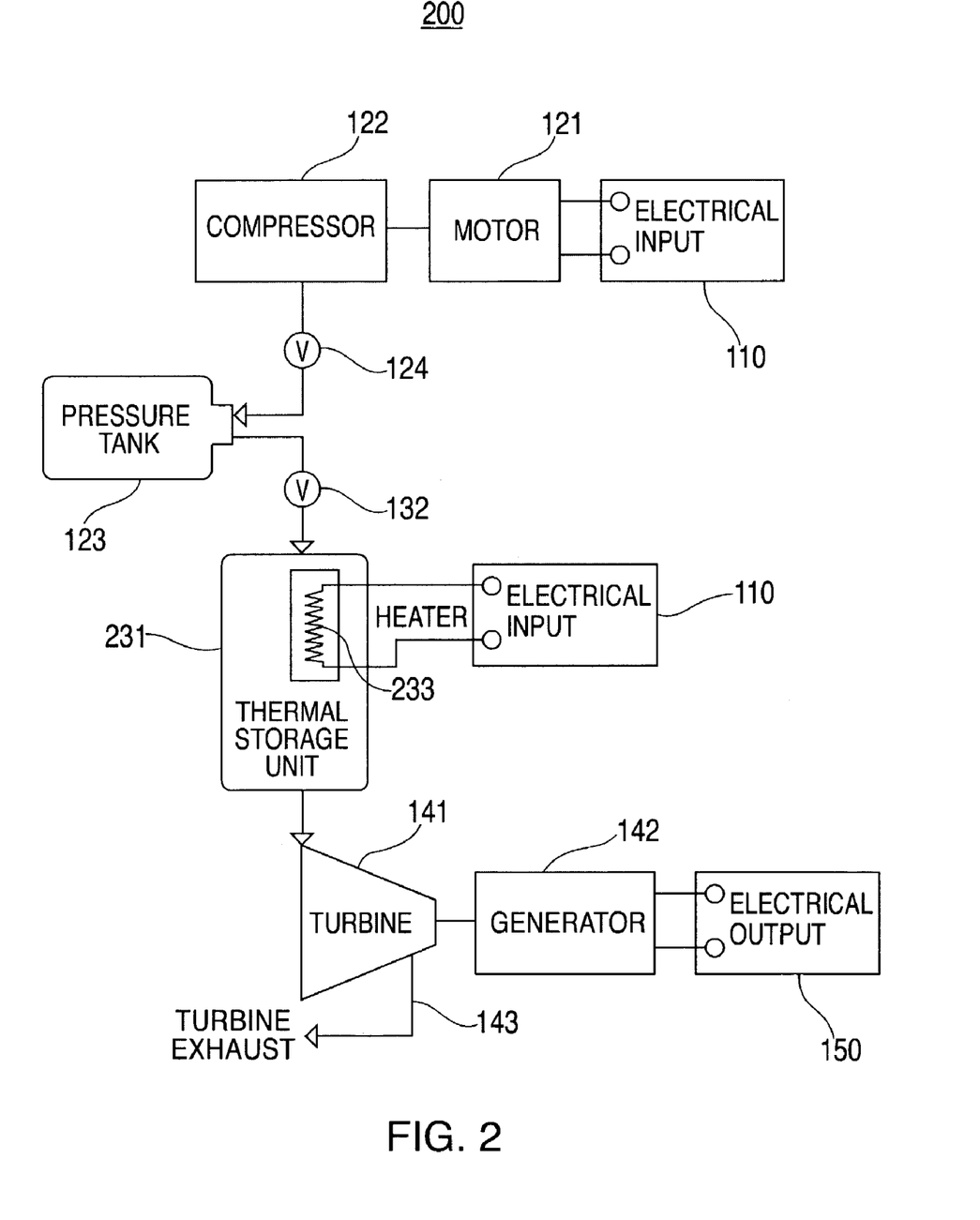
FIG. 2 is a schematic diagram of a TACAS system in accordance with the principles of the present invention.

In accordance with the principles of the present invention, a TACAS system 200 is shown in FIG. 2 which alleviates problems associated with CAS systems 100 and 160. In particular, TACAS system 200 provides the benefits of heating compressed air from pressure tank 123 before it is supplied to turbine 141, without producing the harmful emissions associated with combustion system 131 of CAS system 100. This is accomplished by using an exhaustless heater, or non-combustion heater, such as a thermal storage unit as described below. It will be understood by persons skilled in the art that the term exhaustless heater as used herein refers to any type of heater which does not produce a waste product (e.g., a noxious or toxic emission). For example, this also includes a simple ambient air heat exchanger, which relies on the blowing of ambient air to transfer heat energy, or any other suitable type of heat exchanger or wasteless heater.

Additionally, as a result of the compressed air heating capability in TACAS system 200, larger pressure tanks are not required as is the case with CAS system 160. These and other improvements are evident given the descriptions of TACAS system 200 and the various other embodiments discussed below.

TACAS system 200 is shown to include several components, many of which are substantially similar to those described above with respect to CAS 100 of FIG. 1A. Persons skilled in the art, however, will appreciate that the principles of the present invention may be accomplished using any of the specific configurations described herein, other combinations of those configurations, or even configurations utilizing other components without departing from the spirit of the present invention.

TACAS system 200 includes thermal storage unit (TSU) 231, which replaces combustion system 131 of CAS 100. Once again, electrical input 110 is used to power motor 121. Motor 121, in turn, drives compressor 122, thereby providing compressed air through valve 124 into pressure tank 123, which stores the compressed air. Valves 124 and 132 (the use of which is further described below) may be conventional valves or any other type of suitable device for selectively permitting or preventing the flow of air. Alternatively, compressor 122 or pressure tank 123 may be modified to include the ability to selectively seal and open an air passage way. Moreover, valves 124 and 132 may be replaced by a single valve that selectively routes air from compressor 122 to pressure tank 123, and from pressure tank 123 to TSU 231.

It should be understood by those skilled in the art that although the embodiments of the present invention discussed in detail herein include the use of a motor 121, a compressor 122 and a pressure tank 123 for providing the compressed air that is heated and supplied to turbine 141, the invention is not limited in this manner. For example, an embodiment of the present invention that doesn't use a separate pressure tank 123, could instead use compressor 122 to compress air which would then stored inside an underground salt dome. The compressed air is then routed through TSU 231 to power turbine 141. Alternatively, pressure tank 123 may be a replaceable compressed air cylinder (e.g., a DOT cylinder) that is replaced once it no longer holds compressed air, in which case motor 121 and compressor 122 would not be necessary.

When electric power is needed from TACAS system 200, compressed air from pressure tank 123 is provided through valve 132 to be heated by TSU 231. It should be understood by those skilled in the art that TSU 231 may be any suitable type of heat exchanger which can transfer heat from a thermal storage material (not shown) in TSU 231 to the compressed air coming from pressure tank 123. For example, TSU 231 may be a fluid-filled heat exchanger and storage unit in which oil, for example, is heated to relatively high temperatures (e.g., between 150 and 300 degrees C.). Alternatively, TSU 231 may be made to include, instead of a liquid such as oil, another material such as a ceramic material, or a solid mass (e.g., an iron mass), which can be heated to a higher temperature such as between 150 and 1000 degrees C.

Moreover, it should be understood that TSU 231 may also include a material from which thermal energy may be extracted as the material transitions from a liquid to a solid. For example, TSU 231 may be filled with molten aluminum that is normally maintained at approximately 670 degrees C. When power is needed to be extracted from TACAS system 200, in this instance, the molten aluminum would cool and start to solidify, thus releasing heat at a substantially constant temperature that is then used to heat the air coming from pressure tank 123 before it is routed to turbine 141.

As is illustrated in FIG. 2, the thermal storage material of TSU 231 is heated by resistive heater 233. Resistive heater 233, which is powered by electrical input 110, is in physical contact with the thermal storage material of TSU 231, and heats this material to a predetermined temperature. For example, assuming TSU 231 is a fluid-filled heat exchanger and storage unit, resistive heater 233 heats the fluid (e.g., oil) to the predetermined temperature. The lack of noxious emissions from this type of heating is ideal for indoor applications.

It will also be understood by persons skilled in the art that, alternatively, the thermal storage material of TSU 231 may be heated by any other suitable type of heating system. For example, rather than utilizing resistive heater 233 powered by electrical input 110, a closed-loop pipe containing a fluid (e.g., oil) that is heated by external burners (not shown) may be used. In that case, the heated fluid pumped through the closed-loop pipe may be used to convey thermal energy to the fluid (or other type of material) that makes up the thermal storage material of TSU 231. Moreover, electrically conductive thermal storage materials, such as iron, may be heated inductively. Thus, the invention is not limited in the specific heating manner.

Once the compressed air from pressure tank 123 is heated by TSU 231, the hot air is used to drive turbine 141, which in turn powers electrical generator 142 resulting in power at electrical output 150. Turbine exhaust 143 may then be released by turbine 141 into open air or routed through an exhaust pipe (not shown) to a desired location.

Persons skilled in the art will appreciate that, although a generator 142 is shown in TACAS system 200, an electrical machine (not shown) that is capable of operating, at different times, as a motor or a generator may also be used. In this case, the electrical machine would maintain the rotation of the rotor (not shown) of turbine 141 using electrical input 110 when available. Thereafter, when power is needed from TACAS system 200, the electrical machine would operate as a generator, being driven as explained above by turbine 141.

Figure 3:
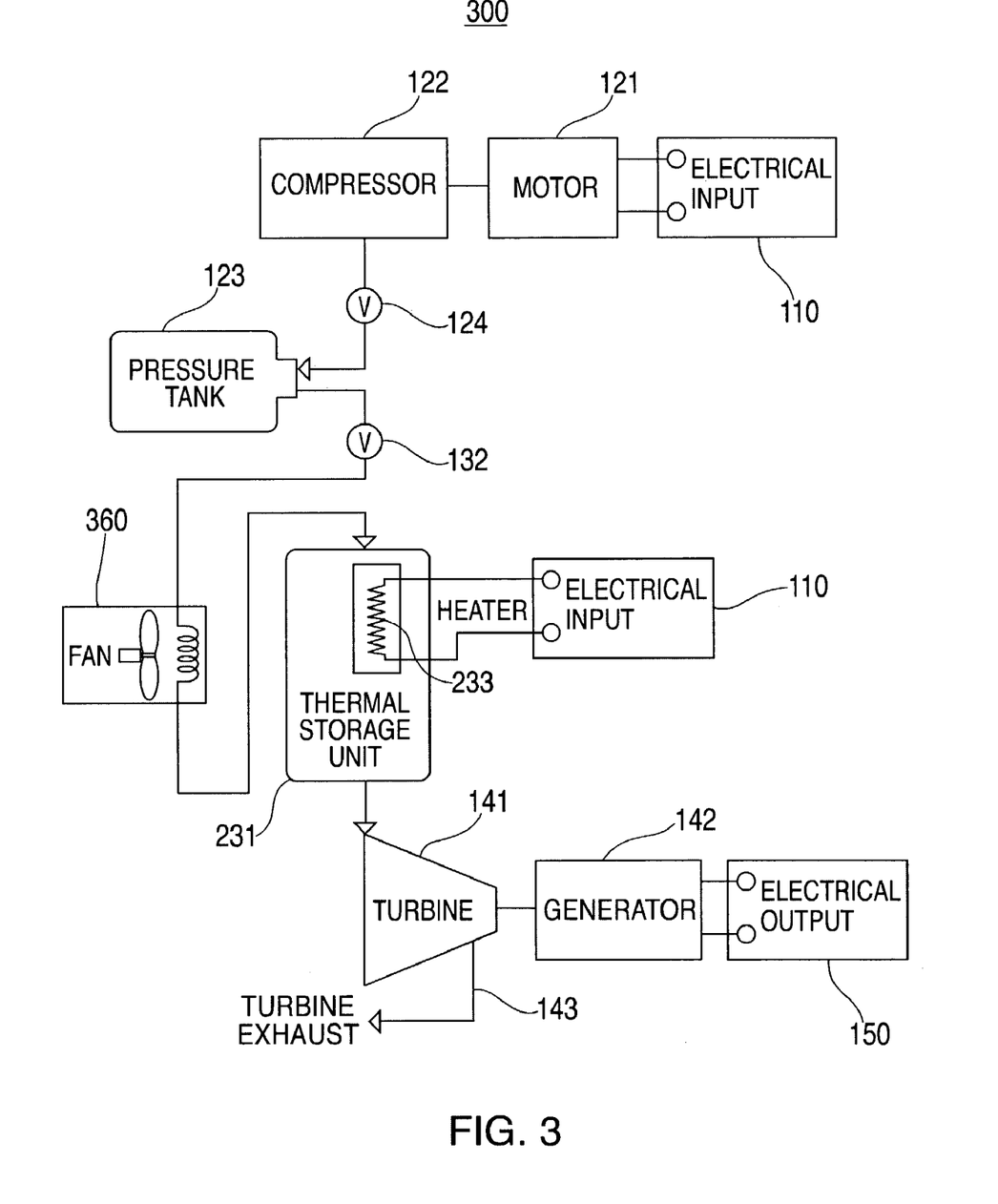
FIG. 3 is a schematic diagram of another TACAS system in accordance with the principles of the present invention.

FIG. 3 shows an additional configuration of a TACAS system 300 that utilizes components from TACAS system 200 and CAS system 100. The primary difference between TACAS system 300 and the previously described systems is that TACAS system 300 utilizes an ambient air heat exchanger 360 that takes heat from ambient air and uses the thermal energy of the ambient air to heat the compressed air coming from pressure tank 123 prior to being supplied to TSU 231. In this manner, the generally below ambient temperature compressed air from pressure tank 123 is pre-heated by the heat of ambient air before being routed to TSU 231.

Although the embodiment shown in FIG. 3 increases the size and complexity from that of TACAS system 200, the tradeoff is that the configuration of TACAS system 300 reduces the amount of thermal storage material necessary in TSU 231 for a given amount of energy, and also increases system "round trip" efficiency which is defined as the electrical energy output divided by the electrical energy input of TACAS system 200.

Figure 4:
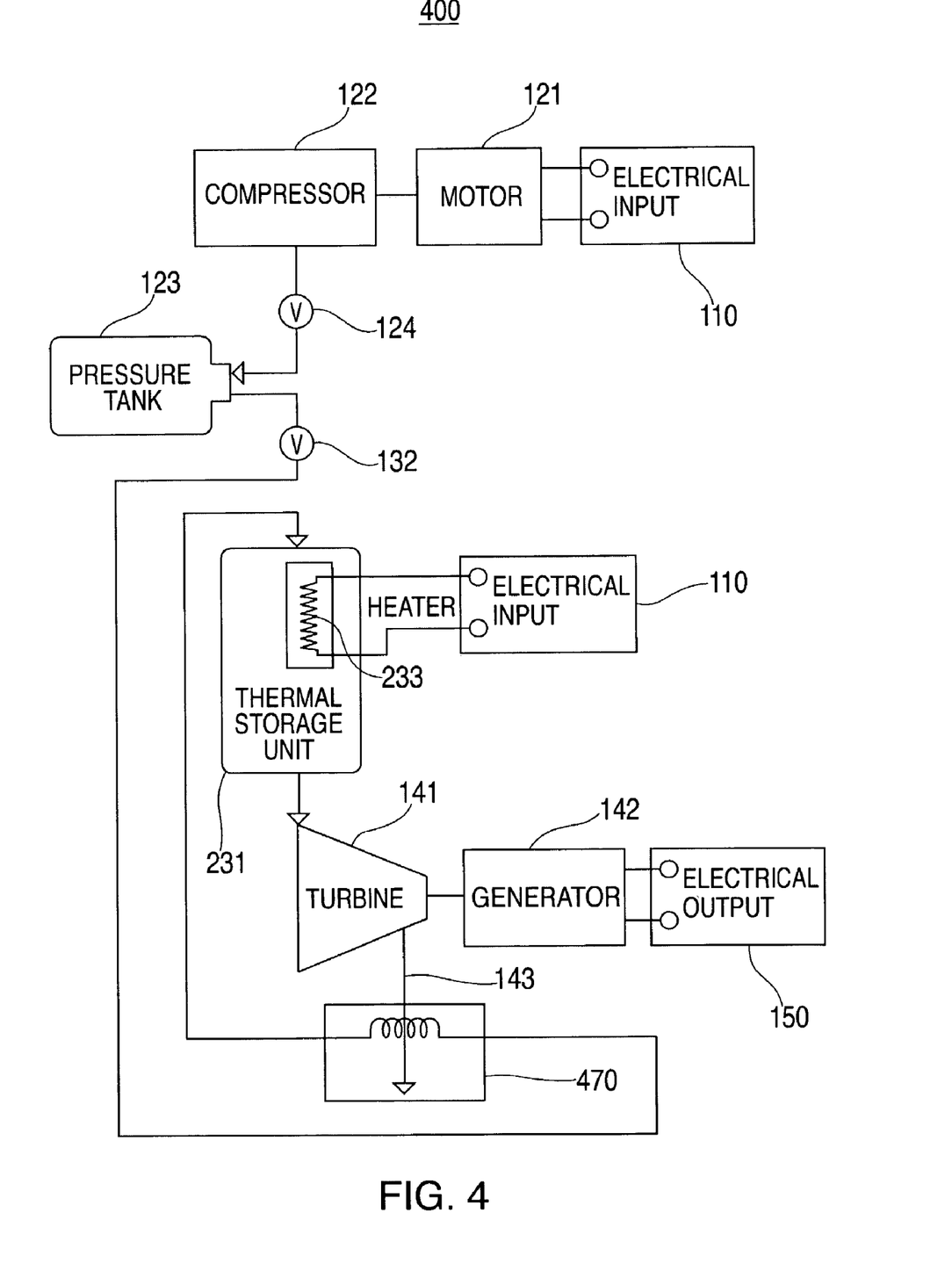
FIG. 4 is a schematic diagram of another TACAS system in accordance with the principles of the present invention.

FIG. 4 shows another configuration of a TACAS system 400 that utilizes components found in CAS system 100 and TACAS systems 200 and 300. Instead of using heat exchanger 360, however, TACAS system 400 utilizes turbine exhaust heat exchanger 470. Heat exchanger 470 utilizes heat from the exhaust of turbine 141 to pre-heat the generally below ambient temperature compressed air from pressure tank 123 before it is routed to TSU 231. Once again, this results in a generally larger and more complex system than that of TACAS system 200, however, TACAS 400 also reduces the amount of thermal storage material necessary in TSU 231 for a given amount of delivered energy, and further increases overall system "round trip" efficiency. This configuration also cools the exhaust from turbine 141, which can be particularly important for indoor applications.

Figure 5:
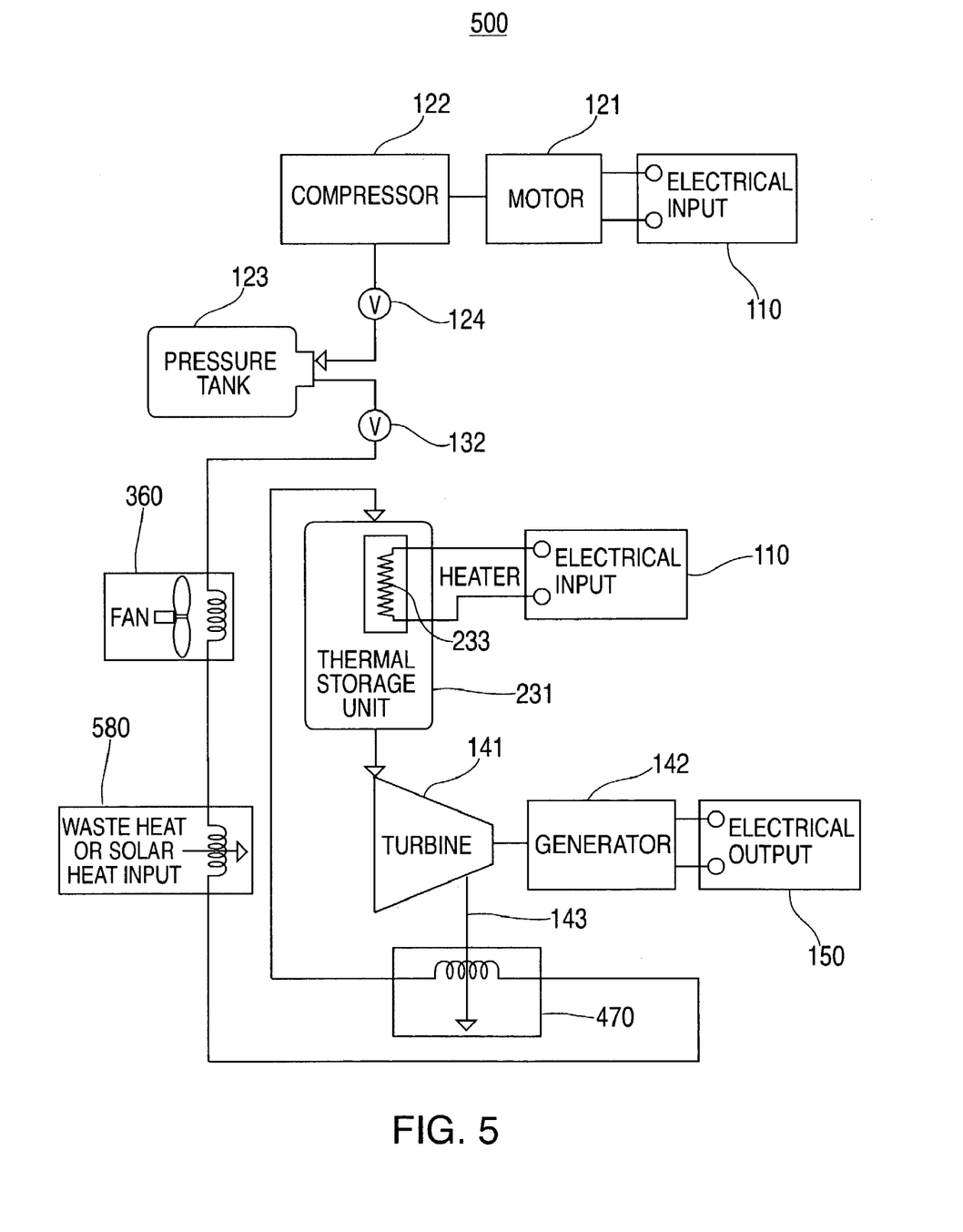
FIG. 5 is a schematic diagram of another TACAS system in accordance with the principles of the present invention.

Persons skilled in the art will understand that the configurations discussed above for TACAS systems 300 and 400 may be combined to further enhance system efficiency. For example, FIG. 5 shows another configuration in TACAS system 500 that includes various components from CAS system 100 and TACAS system 200, as well as heat exchanger 360 from TACAS system 300 in series with heat exchanger 470 from TACAS system 400. Accordingly, TACAS system 500 uses both ambient air heat exchanger 360, that uses heat from surrounding air to heat compressed air coming from pressure tank 123, and turbine exhaust heat exchanger 470, which uses heat from the exhaust of turbine 141 to pre-heat the generally below ambient temperature air from pressure tank 123.

In addition, TACAS system 500 also includes another heat exchanger 580, which may be either a solar energy heat exchanger or a waste energy heat exchanger, to further pre-heat compressed air from pressure tank 123 before it is routed to TSU 231. Heat exchanger 580 uses either solar energy or waste energy (e.g., wasted heat from an industrial process) to further heat compressed air from pressure tank 123. As with TACAS systems 300 and 400, the introduction of additional heat exchangers may add cost and complexity to the system, however, also increases system efficiency. It should be noted that although heat exchangers 360, 470 and 580 are shown in a particular series connection to pre-heat compressed air from pressure tank 123 before routing it to TSU 231, the invention is not limited in this manner. Any combination of these or other types of heat exchangers described in accordance with the principles of the present invention may be used without limitation to a particular order in which the compressed air from pressure tank 123 is pre-heated.

Figure 6:
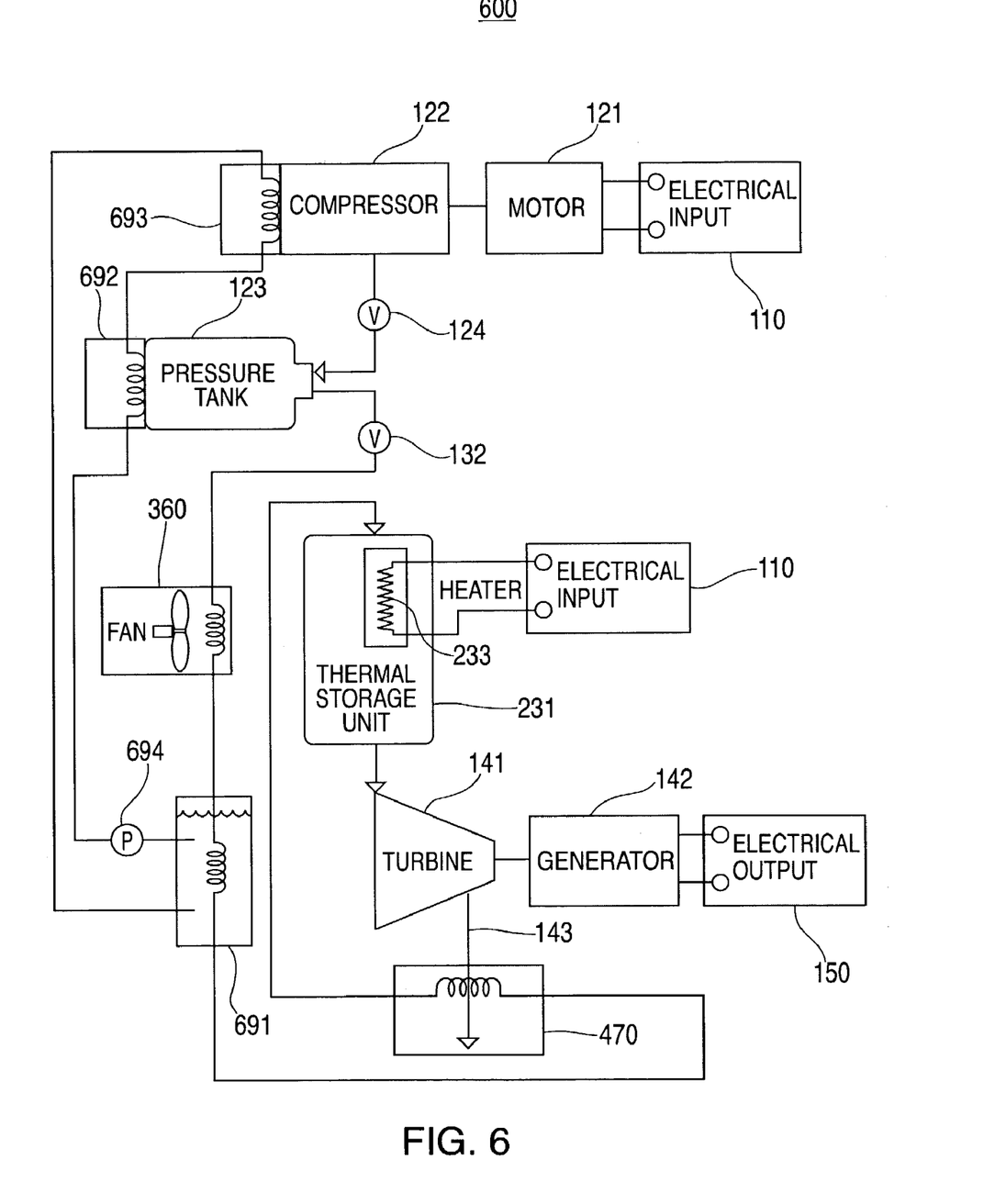
FIG. 6 is a schematic diagram of another TACAS system in accordance with the principles of the present invention.

FIG. 6 shows another embodiment of a TACAS system 600 constructed in accordance with the principles of the present invention. TACAS system 600 includes substantially the same components as TACAS system 500 shown in FIG. 5, except that the solar or waste heat exchanger 580 is replaced by a second TSU 691 (which, together with heat exchangers 692 and 693 described below, forms a compression process heat exchanger) that is generally at a lower temperature than TSU 231. TSU 691 derives its thermal energy by pumping a liquid such as water, using pump 694, through small heat exchangers 692 and 693, which are respectively in thermal contact with pressure tank 123 and compressor 122. In this manner, heat exchangers 692 and 693 capture and store the waste heat given off during the air compression process. Once the air compression process is complete, the captured heat is stored in the liquid in TSU 691 in a thermally insulated reservoir. During discharge, the cold tank compressed air is pre-heated by ambient air heat exchanger 360, then by TSU 691, then by turbine outlet heat exchanger 470, and finally by main TSU 231 before entering the inlet of turbine 141.

Although the incremental heat exchangers may add incremental cost and complexity to the system, this system (and the other systems described above) have the potential for long-term capital expenditure recovery through lower operating costs associated with increased efficiency. Moreover, TACAS system 600 provides enhanced efficiency without requiring a source of solar or waste heat. In particular, much of the heat lost during the compression process can be recaptured from the heat of the surrounding air. If waste or solar heat is also available, and an additional heat exchanger, such as heat exchanger 580, may be added, it may even be possible for the system to generate more power than the power required to compress air into pressure tank 123 and to heat TSU 231.

Figure 7:
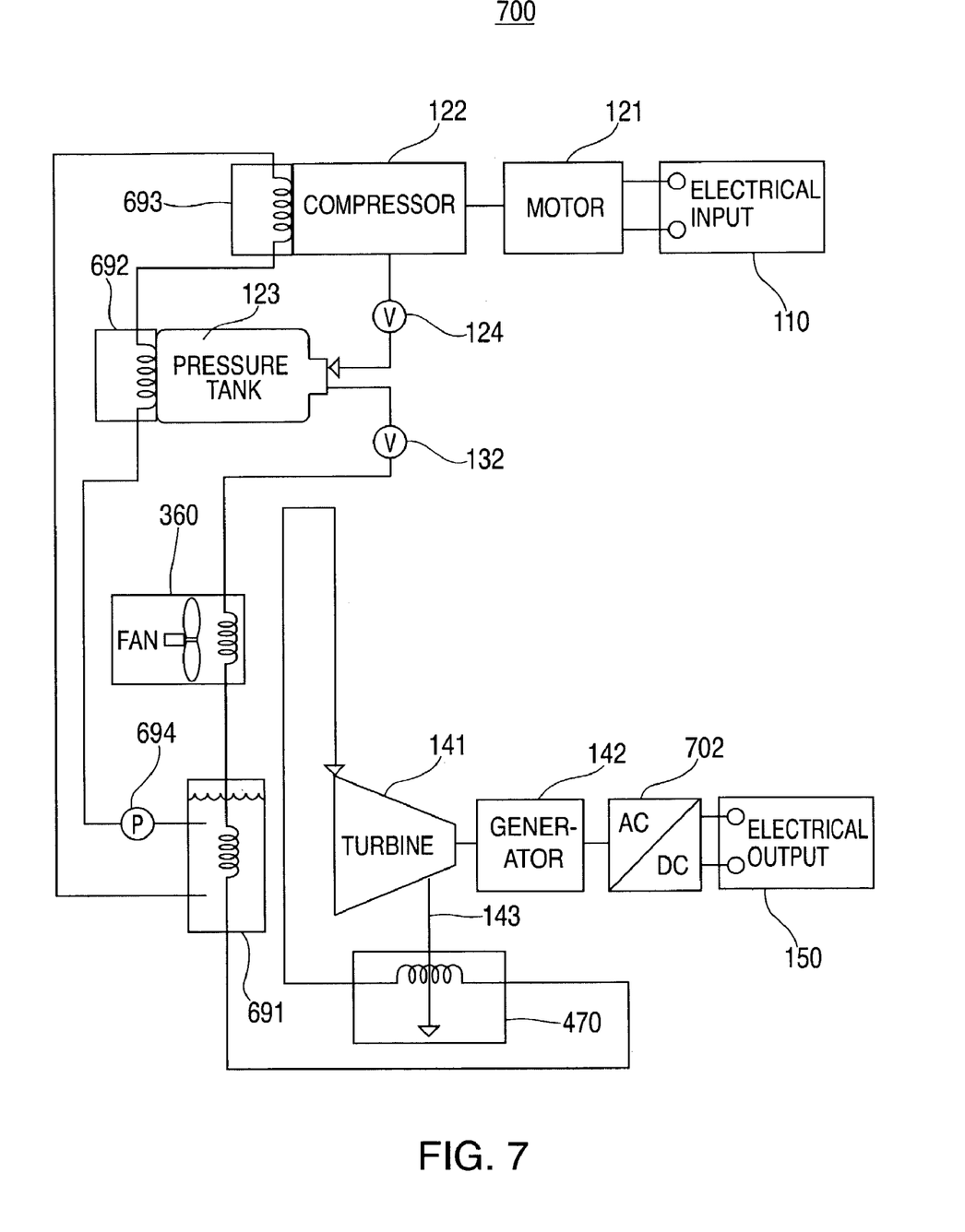
FIG. 7 is a schematic diagram of another TACAS system in accordance with the principles of the present invention that eliminates the use of a thermal storage unit.

FIG. 7 shows a further embodiment of the present invention in TACAS system 700 in accordance with the principles of the present invention. TACAS system 700 is substantially similar to TACAS system 600 described above, except that TSU 231 and its associated components (i.e., heating resistor 233 and its electrical input 110) have been removed and AC-to-DC converter 702 has been added. Persons skilled in the art will appreciate that converter 702 is optional, and that any of the above described embodiments of the present invention may also use converter 702 without departing from the scope of the present invention. For example, it may be beneficial to use converter 702 when a DC electrical output 150 is required by a load which is being supplied power from TACAS system 700.

Moreover, the configuration shown in FIG. 7, which is similar to the configurations described above, provides many improvements over known CAS systems. Namely, a fuel-combustion system is not needed, thus the amount of emissions is substantially reduced. Furthermore, waste heat is reduced through the use of various heat exchangers. TACAS system 700, however, shows an embodiment of the present invention in which cold tank compressed air from pressure tank 123 is heated solely through the use of the various heat exchangers, as shown in FIG. 7, prior to being supplied to the inlet of turbine 141.

The TACAS configuration shown in FIG. 7, while providing reduced pre-heating capabilities when compared with the known TACAS systems described above, may be used when the amount of heating desired is adequately accomplished through the use of, for example, heat exchangers 360, 470 and 691. In this manner, the costs associated with TSU 231 are removed, including the cost of electrical energy to heat the thermal storage material in TSU 231, and the benefit of pre-heating compressed air prior to the air being supplied to turbine 141 is achieved using available waste heat. Alternatively, additional heat exchangers may be added (not shown) as necessary, or one or more of the heat exchangers shown in FIG. 7 may be removed, and any combination of heat exchangers described herein may be utilized (in any order of heating) to accomplish the heating of compressed air which is supplied from pressure tank 123.

Once again, it should be understood by those skilled in the art that the present invention is not limited by the specific configurations described above. For example, it should therefore be noted that although TSU 691 in TACAS systems 600 and 700 is shown to be a fluid-filled heat exchanger and storage unit, the invention is not limited in this manner. Rather, any combination of the above described configurations remain within the scope of the principles of the present invention.

The above described embodiments of the present invention are presented for purposes of illustration and not of limitation, and the present invention is limited only by the claims which follow.

What is claimed is:

1. A thermal and compressed air storage system comprising:
   at least one pressurized tank that stores a predetermined quantity of compressed air;
   at least one exhaustless heater that stores thermal energy coupled to said at least one pressurized tank and operative to heat said compressed air received from said at least one pressurized tank, wherein at least one of the exhaustless heaters is heated to at least 150° centigrade prior to a compressed air discharge event;
   a turbine coupled to said exhaustless heater to receive said heated compressed air, said received heated compressed air driving a turbine rotor in said turbine; and
   an electrical generator that is powered by said turbine when said turbine is driven by said heated compressed air.

2. The thermal and compressed air storage system of claim 1, wherein said system further comprises:
   an AC-to-DC converter coupled between said electrical generator and a load.

3. The thermal and compressed air storage system of claim 1, further comprising:
   a compressor that compresses air that is stored in said at least one pressurized tank.

4. The thermal and compressed air storage system of claim 1, wherein said at least one pressurized tank is a replaceable compressed air cylinder.

5. The thermal and compressed air storage system of claim 1, wherein said exhaustless heater is a thermal storage unit.

6. The thermal and compressed air storage system of claim 5, wherein said thermal storage unit comprises a thermal storage material that is heated by a heating system.

7. The thermal and compressed air storage system of claim 6, wherein said thermal storage material is a liquid.

8. The thermal and compressed air storage system of claim 7, wherein said liquid is oil.

9. The thermal and compressed air storage system of claim 6, wherein said thermal storage material is a solid block of mass.

10. The thermal and compressed air storage system of claim 9, wherein said mass is iron.

11. The thermal and compressed air storage system of claim 6, wherein said thermal storage material transitions between a liquid state and a solid state.

12. The thermal and compressed air storage system of claim 11, wherein said material is aluminum.

13. The thermal and compressed air storage system of claim 6, wherein said heating system comprises a resistive heater that uses electrical power to heat said thermal storage material.

14. The thermal and compressed air storage system of claim 6, wherein said heating system comprises at least a first agent and a second agent that when mixed together produce an exothermic reaction to heat said thermal storage material.

15. The thermal and compressed air storage system of claim 1, wherein said exhaustless heater is an ambient air heat exchanger.

16. The thermal and compressed air storage system of claim 1, wherein said exhaustless heater is a turbine exhaust heat exchanger.

17. The thermal and compressed air storage system of claim 1, wherein said exhaustless heater is a solar energy heat exchanger.

18. The thermal and compressed air storage system of claim 1, wherein said exhaustless heater is a waste energy heat exchanger.

19. The thermal and compressed air storage system of claim 1, wherein said exhaustless heater is a compression process heat exchanger.

20. A method of using compressed air to provide electrical power comprising:
    providing at least one pressurized tank that stores a predetermined quantity of compressed air;
    heating said compressed air received from said at least one pressurized tank with an exhaustless heater that stores thermal energy, wherein said exhaustless heater is heated to at least 150° centigrade prior to a compressed air discharge event;
    driving a turbine using said heated compressed air; and
    powering an electrical generator with said driven turbine to provide said electrical power.

21. The method of claim 20, wherein said providing comprises:
    compressing air; and
    storing said compressed air in said at least one pressurized tank.

22. The method of claim 20, wherein said providing comprises:
    supplying a replaceable compressed air cylinder.

23. The method of claim 20, wherein said heating comprises:
    using a thermal storage unit to heat said compressed air.

24. The method of claim 20, further comprising:
    using an ambient air heat exchanger to heat said compressed air.

25. The method of claim 20, further comprising:
    using a turbine exhaust heat exchanger to heat said compressed air.

26. The method of claim 20, further comprising:
    using a solar energy heat exchanger to heat said compressed air.

27. The method of claim 20, further comprising:
    using a waste energy heat exchanger to heat said compressed air.

28. The method of claim 20, further comprising:
    using a compression process heat exchanger to heat said compressed air.

29. The method of claim 20, wherein said electrical power provided by said electrical generator is AC power, said method further comprising converting said AC power to DC power.

30. A thermal and compressed air storage system comprising:
    at least one pressurized tank that stores a predetermined quantity of compressed air;
    a thermal storage unit coupled to said at least one pressurized tank, said thermal storage unit is preheated to at least 150° centigrade to store thermal energy prior to a discharge of compressed air from the at least one pressurized tank, such that during discharge of the compressed air, the stored thermal energy is used to heat said compressed air received from said at least one pressurized tank;
    a turbine coupled to said thermal storage unit to receive said heated compressed air, said received heated compressed air driving a turbine rotor in said turbine, said thermal storage unit being an exhaustless heater; and
    an electrical generator that is powered by said turbine when said turbine is driven by said heated compressed air.

* * * * *